United States Patent [19]

[11] 3,925,766

Bardotti et al.

[45] Dec. 9, 1975

[54] DYNAMICALLY VARIABLE PRIORITY ACCESS SYSTEM

[75] Inventors: Angelo Bardotti, Cesano Boscone; Renzo Pederzini, Melegnano, both of Italy

[73] Assignee: Honeywell Information Systems Italia, Milan, Italy

[22] Filed: Nov. 27, 1973

[21] Appl. No.: 419,312

[30] Foreign Application Priority Data

Nov. 29, 1972 Italy .................................. 32201/72

[52] U.S. Cl. .............................................. 340/172.5
[51] Int. Cl.² ............................................ G06F 9/18
[58] Field of Search .................................. 340/172.5

[56] References Cited

UNITED STATES PATENTS

| | | | |
|---|---|---|---|
| 3,445,822 | 5/1969 | Driscoll | 340/172.5 |
| 3,473,155 | 10/1969 | Couleur et al. | 340/172.5 |
| 3,534,339 | 10/1970 | Rosenblatt et al. | 340/172.5 |
| 3,611,305 | 10/1971 | Greenspan | 340/172.5 |
| 3,611,307 | 10/1971 | Podvin | 340/172.5 |

*Primary Examiner*—Gareth D. Shaw
*Assistant Examiner*—Michael C. Sachs
*Attorney, Agent, or Firm*—Lewis P. Elbinger, Esq.; Ronald T. Reiling, Esq.

[57] ABSTRACT

Apparatus for variably assigning relative priority levels for access of peripheral units to the memory of a data processing system, wherein each peripheral unit generates a request signal when it requires access to communicate with the memory through a channel connected to the central processor of the system, wherein concurrently occurring request signals are selected according to priority levels assigned thereto, and wherein means is provided to change the priority levels to particular request signals according to the causes for which the request signals are generated or the particular load conditions of the central processor.

4 Claims, 5 Drawing Figures

DYNAMICALLY VARIABLE PRIORITY ACCESS SYSTEM

BACKGROUND OF THE INVENTION

The present invention relates to a system for controlling the access of a plurality of mutually asynchronous data handling devices to a common central apparatus, and more particularly, to such access control for use in data processing systems.

It is known that modern data processing sytems comprise basically a central processor, at least one main working memory, and a plurality of data handling peripheral units which are connected, either individually or in groups, to the central processor by means of control devices or peripheral control processors.

The peripheral units are of various types, including, for example: card reader-punches; tape reader-punches; magnetic tape, disk and drum recording devices; printers and transceivers for transmitting and receiving data.

Such peripheral units must be able to exchange information with the central processor; that is, they must be able to receive information which represents either commands that control a specific type of operation or data to be recorded, printed, punched or transmitted, and to transmit information which represents either particular statuses of the peripheral units or data to be stored or suitably processed by the central processor. If central processors could be provided with very extensive or, in the extreme, unlimited resources, and if the operation of each peripheral unit was independent of the operation of the others, it would be possible for such central processors to exchange information simultaneously with all their connected peripheral units without mutual interference or incompatibility.

However, in actuality, central processors are provided with limited resources; for example, one or a few working memories, one or a few arithmetic units, a few registers for storing information pertaining to the status of the information exchange with the respective peripheral unit, and, a limited number of sockets for physically connecting peripheral units to the central processor.

Therefore, it follows that a central processor cannot exchange information simultaneously with all of its connected peripheral units.

While large-scale computers which have multiple resources can provide simultaneous information exchanges with several peripheral units if different parts of the computer are involved, the circumstance that generally the different peripheral units may involve the same resource must be considered.

For instance, if two peripheral units simultaneously request the central processor to provide two items of information stored in the same memory, but the memory permits only a single access thereto at a time, it is clear that both requests cannot be satisfied simultaneously.

Therefore, the problem arises of determining some ordering criterion to be followed in performing a plurality of information exchanges for the peripheral units.

If the progress of each such information exchange were exactly predictable in terms of its events and their timing, it would be possible to mutually organize the several information exchanges to provide for a single exchange directly programmable in advance under control of the central processor, wherein possible conflicts in timing would be resolved in advance as appropriate.

However, such predictability is not possible. Therefore the central processor is usually faced with the problem of choosing between simultaneous requests for information exchange. This possibility must be signalled in advance; for instance, by means of an "availability signal" supplied by each peripheral unit.

Another aspect of the problem also must be considered. Due to the peculiarities of their physical embodiment, many peripheral units impose the particular restriction that the exchange of information therewith, for at least certain items of information, take place within predetermined time limits after the generation of its availability signal.

In this case, the availability signal assumes the more peremptory aspect of a demand, calling for an immediate answer by the central processor. The central processor may even be required to interrupt other operations, including other information exchanges, in order to process the demand of a peripheral unit.

For this reason, the results forwarded by the peripheral units to indicate the availability or the need for exchanging information are usually called "interrupt requests".

Several interrupt requests may be pending at a given time in the central processor, and many different ordering criteria for answering such requests may be followed. In the prior art, the main criteria followed were the temporal criterion (the interrupt requests were answered in the order in which they were presented), the criterion of assigning fixed priorities to the respective information exchange channels or the peripheral units from which the interrupt requests were received, or a combination of these criteria.

In order to effect a greater flexibility in such priority assignments, various kinds of interrupt requests have been employed. For instance, the requests have been transmitted on different leads according to their priority, or transmitted on a single lead, but characterized as to their priority by means of accompanying codes. Thus, different levels of importance were established according to the requesting peripheral unit or the kind of requested service.

However, the behavior of the central processor was inflexible in the sense that the response of the central processor to a given priority representing stimulus was always the same.

Accordingly, it is the object of the present invention to obviate these disadvantages of the prior art systems by means of apparatus which defines priorities in a program-controlled dynamic way.

Another object of the present invention is to provide apparatus which, when a particular interrupt request is presented, enables the response of the central processor to change according to the circumstances.

SUMMARY OF THE INVENTION

The present invention applies equally well to the case where different peripheral units forward interrupt requests on a single lead; to the case where interrupt requests of different kinds, that is of different levels of importance, are forwarded on different leads, one for each interruption kind; and to the case where interrupt requests of different kinds are presented on different leads in coded form.

Thus the priority scheme provided by the invention acquires extreme flexibility, because a different priority level may be assigned to any given interrupt request according to the circumstances, in relation to the causes originating the request, or even, if desired, in relation to the particular load conditions of the central processor.

Moreover, the invention makes it possible to modify the effect of an interrupt request, not only its priority level relative to that of other requests but also with reference to other features of the request scheme.

For instance, the invention can control whether a given request has interrupting power over other information exchanges in progress at a lower priority level, or whether a request, when being serviced, may be interrupted by new interrupt requests at a higher priority level and having effective interrupting power.

The instant invention is operable in a system having a number of input/output channels for connection to peripheral units, each channel being provided with at least one lead for transmitting interrupt requests. The invention comprises a logical priority network provided with conditioning elements, a first set of input leads for receiving the interrupt requests, and a second set of input leads to receive control or conditioning signals for organizing the conditioning elements into a hierarchy. The interrupt requests are applied to the first input lead set. A set of registers, one register for each channel, is provided to store instructions received from the central processor and to specify the priority levels assigned to the interrupt requests of the corresponding channels. The output leads of these registers are connected to the second set of input leads for applying the conditioning signals to the logical priority network.

BRIEF DESCRIPTION OF THE DRAWING

The invention will be described with reference to the accompanying drawing, wherein.

DESCRIPTION OF THE PREFERRED EMBODIMENT

Figures 1, 2:
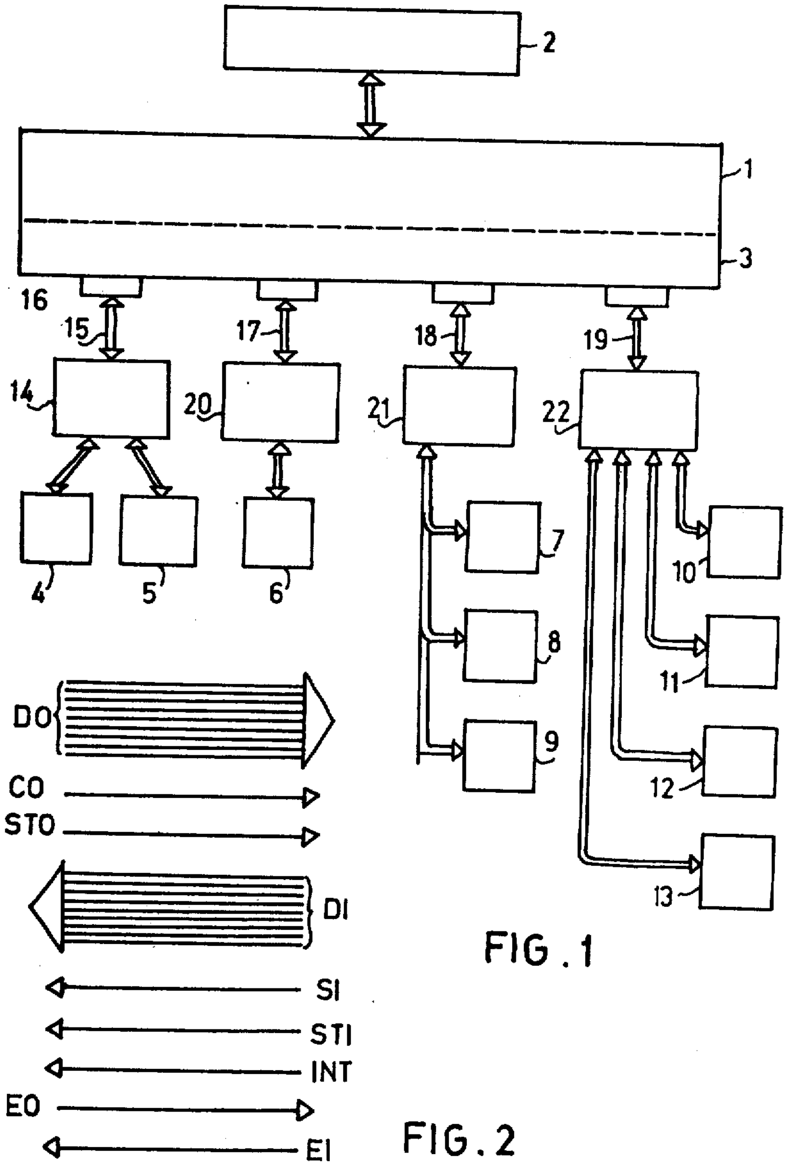
FIG. 1 is a simplified block diagram of the organization of a data processing system.
FIG. 2 shows, diagrammatically, an interface of connection between the central processor and the peripheral units of the data processing system of FIG. 1.

The data processing system of FIG. 1 comprises: a central processor 1, a main working memory 2, an information exchange control unit 3 which forms part of central processor 1, and a plurality of peripheral units 4 to 13.

Peripheral units 4 and 5 are coupled to central processor 1 by means of a peripheral control unit 14 for example. Peripheral control unit 14, also termed an "interface adapter", communicates with central processor 1 by means of a set of wires comprising an information exchange channel 15.

Channel 15 is connected to the central processor by means of a plug-and-socket arrangement 16. Channel 15 is used as information exchange channel for both of the peripheral units 4 and 5 connected to the peripheral control unit 14. In general, any number of peripheral units may be connected to a single peripheral control unit. Therefore, a distinction is commonly made between the terms "channel" and "subchannel".

By "channel" it is meant a set of wires and related specific resources, including logical circuits and registers uniquely associted with the set of wires, which enables communication with a central processor.

By "subchannel" is meant the same set of wires and resources of a channel when considered as a communication means between a central processor and a specific peripheral unit selected from among several peripheral units by a common control unit. In the example considered, channel 15 comprises two subchannels for communication with respective peripheral units 4 and 5.

Usually a central processor is provided with a plurality of sockets and connected channels and with a larger number of subchannels.

Thus, FIG. 1 shows, by way of example, four channels 15, 17, 18 and 19, connected to as many respective control units 14, 20, 21 and 22.

Whenever a peripheral unit is required to transfer information to the memory or receive information from the memory, a communication path must be established within central processor 1 between the corresponding socket and memory 2 and within the corresponding one of peripheral control units 14, 20, 21 and 22, between the corresponding plug and the peripheral unit. This is accomplished by information exchange control unit 3, according to pre-established priority criteria, and by the involved peripheral control unit.

It is apparent, barring exceptions, that when a channel is busy exchanging information with a particular peripheral unit; i.e., when a given subchannel thereof is coupled to the central processor, no other exchange of information may take place on that channel. The only permitted overlap is the forwarding by the peripheral control unit of interrupt requests pertaining to a different peripheral unit.

On the other hand, within the central process such overlap is permitted by a "time sharing" process, in which different time intervals are assigned in sequence to the different channels for effecting partial exchanges of information according to priority criteria established by information exchange control unit 3.

FIG. 2 shows physical structure of an exemplary interconnection channel.

A set DO of nine wires forms a channel for the parallel transfer of eight bits of binary coded information and of a check (or parity) bit. The arrow pointing to the right indicates that the information comes from the central processor.

A wire CO is employed for forwarding to a peripheral control unit a signal denoting whether the information on wire set DO is to be considered as data, or otherwise, such as an address for a peripheral unit or a command.

A wire STO is employed for forwarding to a peripheral control unit a timing pulse, or "strobe". The signals on wire set DO and on wire CO are effectively recognized only during the occurrence of this strobe pulse.

Wire set DI and wires SI and STI have the similar functions, that is respectively: to transfer eight bits of binary coded information and a check bit from a peripheral control unit to the central processor, to forward to the central processor a signal denoting whether the information on wire set DI is data or the status of a peripheral unit, and to forward a strobe pulse.

A wire INT is used to forward an interrupt request which may require, according to the circumstances, a transfer of data to the peripheral unit, permission to transfer data to the central processor, or a recognition by the central processor of certain unusual events in or status of a peripheral unit.

Finally, the wires EI and EO are used for signalling, respectively by a peripheral unit or by the central processor, the end of a communication or a communication period.

The group of wires and related signals described with respect to FIG. 2 is called an "interface".

Prior to describing the organization and the operation of information exchange control unit 3, where the invention proper resides, it is useful to briefly illustrate an example of a possible form of information exchange through an interface.

Assume that central processor 1 must transfer a certain amount of data, in the form of eight-bit characters plus check bits, to peripheral unit 4, to be printed or otherwise processed. First, peripheral unit 4 must be selected; i.e., addressed and prepared for operation.

To this effect, central processor 1 forwards to peripheral control unit 14, through channel 15 on wire set DO thereof, the appropriate character. This character is accompanied by a signal on wire CO of channel 15, characterizing said character as an address for peripheral unit 4, and by a strobe pulse on wire STO of channel 15. Peripheral control unit 14 stores this information in a suitable input register and selects peripheral unit 4.

Next, central processor 1 forwards over channel 15 a command specifying the operation to be performed to peripheral control unit 14 on wire set DO, as well as a signal on wire CO and a strobe on wire DO.

In the instant example, it is assumed that peripheral unit 4 is a synchronous serial printer, and that the command forwarded therefor is a Line Feed and Carriage Return command.

Peripheral control unit 14 receives this command, forwards it to peripheral unit 4, and controls the required operations. Meantime, central processor 1, ignoring peripheral control unit 14, is performing other operations; for example, it may be performing internal calculations, or providing for the exchange of information through other channels.

When the Line Feed and Carriage Return operation is completed, peripheral control unit 14 signals such status to central processor 1 by sending an interrupt request on wire INT of channel 15.

If no other interrupt request of higher priority from other channels is pending, central processor 1 sends to peripheral control unit 14, on wire set DO and wires CO and STO of channel 15, a command requesting the identity of the interrupting peripheral unit. This is because in the instant example, two peripheral units are connected to peripheral control unit 14 and the interrupt request could have originated from either one.

Peripheral control unit 14, on wire set DI and wires SI and STI of channel 15, now supplies the required information, whereupon central processor 1 replies (on wire set DO and wires CO and STO) requesting the status of the requesting peripheral unit.

Peripheral control unit 14 then answers by communicating, on wire set DI and wires CI and STI, the requested information; i.e., that the Line Feed and Carriage Return operation has been executed. At this point central processor 1 may regard the exchange of information as concluded and the interrupt request fulfilled and therefore transmits an END signal on wire EO. In response to this END signal peripheral control unit 14 clears the interrupt request signal, which was "on" until then.

Thereafter, if central processor 1 requests a printing operation, peripheral unit 4 is selected anew and the onset of the printing operation is controlled through the following signal sequence.

The printing operation requires the sequential transferring of characters from central processor 1 to peripheral unit 4 with a defined periodicity. Peripheral control unit 14 therefore transmits requests for characters periodically, by means of interrupt request signals on wire INT. To each such request, central processor 1 replies by transferring on wire set DO of channel 15 a character at a time, accompanied by a strobe pulse on wire STO. Every time that a character is received the interrupt signal is cleared, and then is transmitted again whenever a new character is required.

At the end of the printing operation, the last character sent by central processor 1 to peripheral unit 4, through peripheral control unit 14, is accompanied by an END signal on wire EO, whereupon no further interrupt requests are forwarded by peripheral control unit 14.

The example considered above demonstrates certain aspects of the information exchange. First, following completion of the Line Feed and Carriage Return operation, the peripheral control unit forwarded to central processor 1 an interrupt request which had no peculiar urgency characteristics, as it only required the attention of the central processor for communicating information about the status of the printer.

Second, however, the interrupt requests relating to the need for characters to be printed required that the central processor answer with a certain promptness, to permit the proper synchronous operation of the printer.

Therefore, the same signal on wire INT has a different level of importance for the two cases considered. However, in addition, this different importance level for the same signal under two different peripheral circumstances may occur for each of two different peripheral units coupled to the same channel by means of a common peripheral control unit.

Assume, for example, that peripheral unit 5, connected to control unit 14 is a disk unit. This is fairly improbable, but such hypothesis helps to clarify the concept. It is known that the disk units have timing requirements for the interchange of character far more stringent than those of other peripheral units, such as the printers. Therefore, when the selected peripheral unit is a disk unit, and it sends on wire INT of channel 15 interrupt requests for exchanging data, such requests have an urgency level far higher than the previously considered interrupt requests. Accordingly, interrupt requests from such a disk unit should be accorded precedence over interrupt requests forwarded on other channels for slower peripheral units.

This requirement is provided by means of the dynamically variable priority access system of the present invention.

Thus, in accordance with the invention, at the beginning of each exchange of information with a particular peripheral unit through a predetermined channel, the priority level to be assigned to the interrupt requests on such channel may be established by means of suitable commands from the central processor. Therefore, it is possible to take into account the best manner of handling the different requirements of each peripheral unit, without being compelled, for instance, to particularize the different channels according to the differet kinds of peripheral units.

Furthermore, during an information exchange, if the requirements change, the invention provides for rearranging the priority levels by means of central processor commands.

Figure 3:
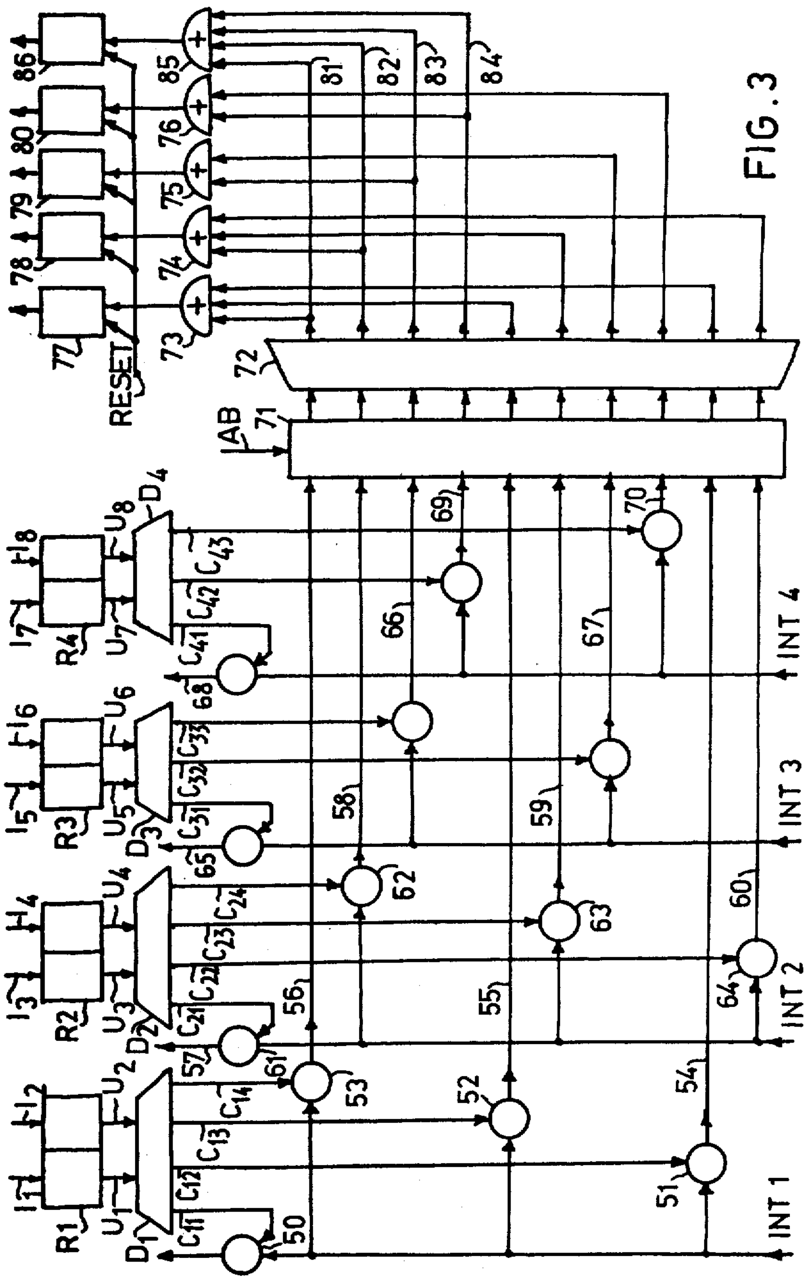
FIG. 3 is a block diagram of a variable priority network of the invention for responding to the interrupt requests forwarded by a plurality of peripheral units to the central processor of a data processing system.

FIG. 3 shows in simplified form an embodiment of such an access system, which is part of information exchange control unit 3 of FIG. 1. Only those elements of information exchange control unit 3 that are related to the variable priority access system are represented in FIG. 3.

Four input leads for receiving interrupt requests, each lead being assigned to a channel of the central processor, are designated respectively as leads INT 1, INT 2, INT 3 and INT 4.

For the priority system, each channel is provided with a respective one of two-bit registers $R_1$, $R_2$, $R_3$ and $R_4$. Each of registers $R_1$–$R_4$ is a part of the appropriate resources associated with each channel, such resources being provided for storing status information of or processing information for the operating program for the channel. In fact, in interrupting a first working program for a first channel and proceeding with a second program for a second channel, it is necessary to store, in some manner, the status of the first channel at the moment of interruption of the first program, in order to be able to resume it afterwards from the same point, and it is necessary to have available all information relating to the second channel that is needed to proceed with the execution of the second program.

Each of registers $R_1$–$R_4$ is provided with a respective pair of input leads $I_1$, $I_2$; $I_3$, $I_4$; $I_5$, $I_6$; and $I_7$, $I_8$, which receives microcommand codes specifying, for each input channel, the priority level assigned to the interrupt requests forwarded on the channel. These microcommand codes may be generated, for example, by decoding a microinstruction contained in a microprogram memory, together with other microprograms performing specific tasks within the central processor. The microinstructions, in turn, are read out in suitable sequence by a working program.

As the principles and the techniques of microprogramming are well known to those skilled in the art, no details on this subject are provided herein which are not needed for an understanding of the invention.

The microcommand codes supplied to input leads $I_1$ to $I_8$ of registers $R_1$–$R_4$ will transfer such registers to predetermined states.

The output leads $U_1$ to $U_8$ of registers $R_1$–$R_4$ are connected to the input leads of decoders $D_1$, $D_2$, $D_3$ and $D_4$.

Each of decoders $D_1$-$D_4$ is provided with four respective output leads $C_{11}$, $C_{12}$, $C_{13}$ and $C_{14}$; $C_{21}$, $C_{22}$, $C_{23}$ and $C_{24}$, etc. Only one output lead of each decoder delivers a signal at any given time. This signal is applied to a conditioning network.

When a signal is present, for instance, on output lead $C_{11}$, an interrupt request received on lead INT 1 will be transmitted through a gate 50 to the central processor by means of a diagnostic network not shown. If a signal is present on one of output leads $C_{12}$, $C_{13}$ or $C_{14}$, an interrupt request received on lead INT 1 will be transmitted through a respective one of gates 51, 52 or 53 to a respective one of leads 54, 55 or 56.

In a similar manner, an interrupt request received on lead INT 2 will be transmitted through one of gates 61, 62, 63 or 64 to a respective one of leads 57, 58, 59 or 60, according to whether a signal is present on a respective one of output leads $C_{21}$, $C_{24}$, $C_{23}$, or $C_{22}$. Interrupt requests received on leads INT 3 or INT 4 will be handled similarly. However, interrupt requests on lead INT 3 are transmitted only on leads 65, 66 or 67, and those on lead INT 4 are transmitted only on leads 68, 69 or 70. It is not necessary that the interrupt requests of each of leads INT 1-INT 4 are able to be transmitted on the same number of leads, as this number may change according to requirements.

Figure 5:
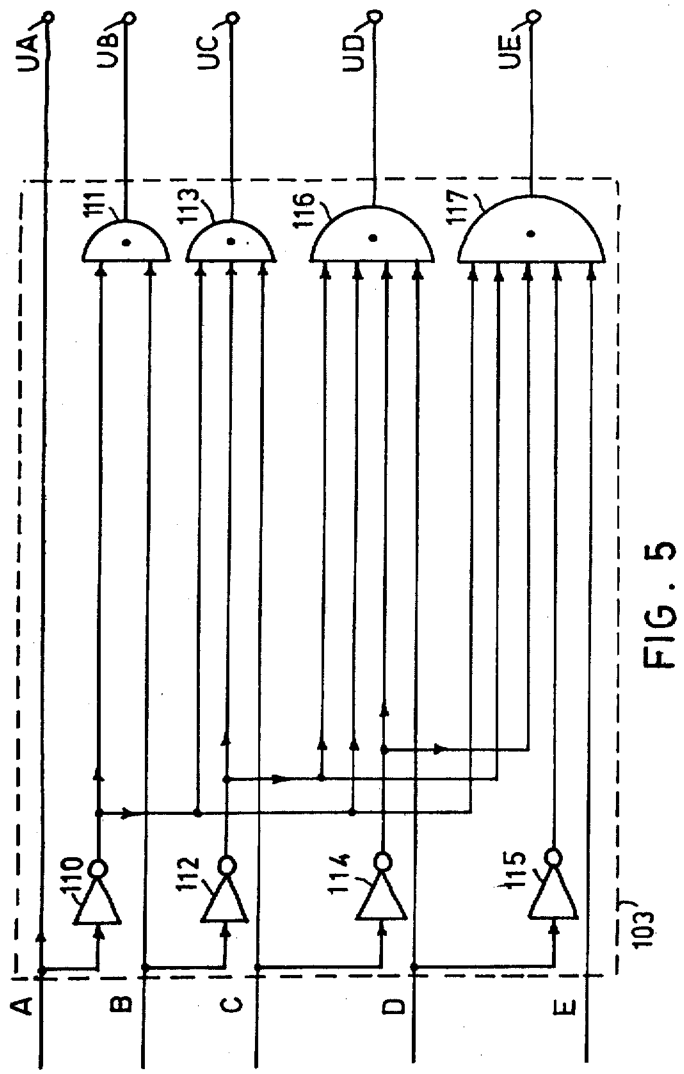
FIG. 5 is a block diagram of a priority selecting matrix which may be employed in the variable priority network of the invention.

The leads 54, 55, 56, 58, 59, 60, 66, 67, 69 and 70 form a set of transmission leads for interrupt requests, whose priority may be established in a fixed manner. A set of gates 71, controlled by a common timing pulse AB, passes the signals present on such transmission leads to a priority selecting matrix 72, provided with an equal number of output leads. Such a matrix 72, shown in FIG. 5, and further described hereinafter, arranges the input leads thereof according to a criterion of relative priority and permits only the signals accorded the highest priority relative to the others to be transmitted.

The output leads of priority selecting matrix 72 are rearranged to provide a single lead per channel by means of OR gates 73, 74, 75 and 76 followed by respective ones of flip-flops 77, 78, 79 and 80.

Only one such flip-flop at a time, that corresponding to the interrupt request having the highest priority, will be set.

The output signals of flip-flops 77, 78, 79 and 80 provide the central processor with a representation of the channel whose interrupt request must be answered first.

Flip-flops 77–80 may be reset by a RESET signal generated slightly in advance of the signal AB.

From the preceding description it is apparent that, by means of microcommands from the central processor, it is possible to modify the relative priority level of the interrupt requests forwarded by different channels, whenever desired, in order to adjust for the different kinds of peripheral units which generate the interrupt requests as well as for the different priority levels which a given peripheral unit may require in the course of specific operations. Moreover, as has been mentioned previously, not only does the invention enable the modifying of the priority level of the different interrupt requests, but it also enables controlling, according to the circumstances, whether the operations which have caused the issuance of interrupt requests may be interrupted before completion.

Thus, an operation which has issued an interrupt request may need a relatively long time interval, several machine cycles, to be completed. In many circumstances it may be convenient to interrupt such an operation in order to satisfy a later-generated interrupt request having a higher priority. From this point of view the operations associated with an interrupt request may be specified as interruptible or non-interruptible. According to the present invention, this requirement which, previously, was inflexibly determined by the physical structure of the central processor, may now be modified by microprograms.

FIG. 3 also illustrates this capability of the present invention.

Some of the output leads of priority selecting matrix 72; namely leads 81, 82, 83 and 84 are coupled by means of a gate 85 to a single lead connected to a flip-flop 86.

The signals present on leads 81-84, and corresponding to predetermined priority levels, also function as "non-interruptibility signals". The information represented by the non-interruptibility signals is stored in flip-flop 86 and transmitted to the central processor.

As has been described above, the interrupt requests are transferred to priority selecting matrix 72 only when a timing pulse AB is present. Timing pulse AB is generated periodically by the central processor, for instance at the end of each machine cycle, and provides for assigning the following machine cycle to the channel having a priority request recognized as having highest priority by matrix 72. A non-interruptibility signal inhibits succeeding timing pulses AB for the whole number of machine cycles needed to carry out the operation associated with the interrupt request providing this non-interruptibility signal.

Therefore any interrupt request, even of higher priority, received on any channel is not transferred to matrix 72 and, therefore, is not recognized until the operation related to the non-interruptible request has been completed.

The above-described system of dynamically variable priority, wherein a single interrupt request may occur on each channel, is also suitable for use when a plurality of interrupt requests may occur on a single channel.

Although in the above-described example the interrupt request is provided as a continuous signal, which terminates only after completion of the related operation, in many cases it is preferable to provide interrupt requests in the form of pulse signals. In such case some storage means is required.

Figure 4:
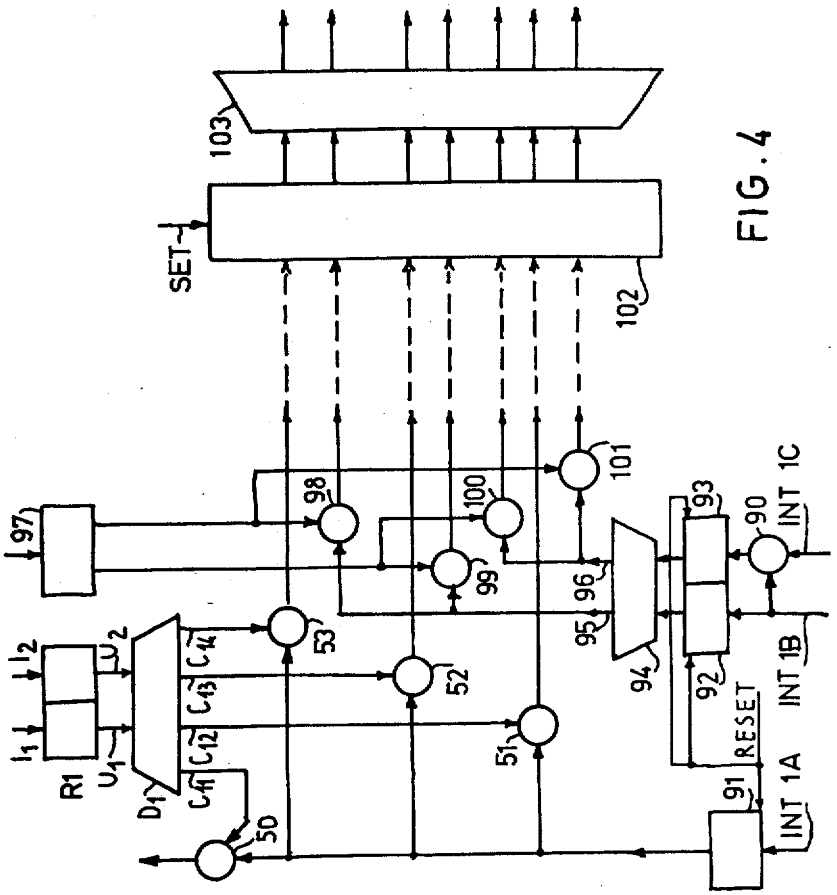
FIG. 4 is a block diagram of a second embodiment of the variable priority network of the invention.

FIG. 4 illustrates an embodiment of the invention for use in the case where a plurality of interrupt requests leads is provided for each channel, and for providing appropriate storage registers for the interrupt requests.

FIG. 4 shows a channel provided with a main interrupt request lead INT 1A and two additional interrupt request leads INT 1B and INT 1C. Leads 1B and 1C are adapted to forward interrupt requests in coded form; in this case, up to four different interrupt requests may be forwarded to the central processor. These different interrupt requests may represent different peripheral units and different degrees of urgency, so that different priority levels may be assigned to them.

In order to avoid an undue number of leads of the interface only one additional lead INT 1B may be provided, but some wires of the set DI may be assigned to forwarding interrupt signals. In this instance, when a signal on lead INT 1B is present, the signals appearing on such assigned wires of set DI are interpreted as interrupt signals. The signal on lead INT 1B may be used also as strobe signal for such wires, thus avoiding the risk of a wrong interpretation of the interrupt requests due to the distribution of the signals.

With respect to FIG. 4 it will be assumed that lead INT 1C is one of the wires of wire set DI. Therefore lead INT 1B carries only a characterizing and strobing signal. Thus, only two different types of interrupt requests may be represented on the two leads INT 1B and INT 1C.

The characterization of a signal on lead INT 1C as an interrupt request, and its timing, is provided by AND gate 90 under control of lead INT 1B.

The interrupt requests forwarded on leads INT 1A, INT 1B and INT 1C are stored in respective flip-flops 91, 92 and 93.

The priority level of the interrupt request forwarded on lead INT 1A is assigned by the central processor by means of register $R_1$ and a conditioning network comprising decoder D1 and AND gates 50, 51, 52 and 53, as explained with reference to FIG. 3.

The interrupt requests forwarded on leads INT 1B and INT 1C are decoded at the output leads of flip-flops 92 and 93 by a decoder 94.

Under the assumption that only two different kinds of interrupt requests may be forwarded on leads INT 1B and INT 1C, decoder 94 has only two output leads 95 and 96.

The priority levels of these interrupt requests are assigned by means of a flip-flop register 97, which is controlled by the central processor, and AND gates 98, 99, 100 and 101. Because, in this portion of the embodiment shown in FIG. 4 it is sufficient to vary the priority level between only two values, no decoder is provided for the output of register 97, so that the output signals of register 97 directly control gates 98, 99, 100 and 101.

Other channels, not shown, also may be provided with a plurality of interrupt request leads and corresponding conditioning logic. All of the interrupt requests delivered by the conditioning logic are stored in a register 102, which has as many cells as there are possible priority levels.

Register 102 is periodically loaded by means of a SET signal, and, after a proper delay with respect to this signal, a RESET signal provides for resetting input flip-flops 91, 92 and 93 to enable them to receive new interrupt requests from the various channels.

Priority selecting matrix 103 provides for transferring to the central processor the single interrupt request having the highest priority among those present on the output leads of register 102. A brief description of priority selecting matrix 103 will be now provided for the embodiment represented in FIG. 5.

Leads A, B, C, D and E represent respective priority levels in decreasing order of priority.

Each of leads A–E forwards an interrupt request of a different level. Thus, a plurality of interrupt requests may be present at the same time on leads A–E, which comprise the input leads of the priority selecting matrix.

Lead A, corresponding to the highest priority level, is directly connected to an output lead UA of the matrix, and is also connected to the input lead of an inverter 110.

The output lead of inverter 110 is connected to one input lead of a two-input AND gate 111. Lead B is connected to the other input lead of gate 111. The output lead of AND gate 111 is the second output lead UB of the matrix. Thus an interrupt signal on lead B will be transferred to output lead UB only if an interrupt signal is not present on lead A.

Similarly, lead B is connected to the input lead of an inverter 112. The output lead of inverter 112, the output lead of inverter 110, and input lead C are connected to the respective input leads of a three-input AND gate 113, whose output lead is the third output lead UC of the priority selecting matrix. An interrupt signal on lead C will be transferred to output lead UC only if at that time no signal is present on leads A and B.

Inverters 114 and 115 and AND gates 116 and 117 are employed similarly to deliver output signals on respective output leads UD and UE only if no interrupt signal of a higher priority level is present.

The individual elements and components of the embodiments of the instant invention have been disclosed in detail in many publications preceding 1970. For example the registers, gates, OR-gates, gate set, flip-flops and decoders of FIG. 3 have been disclosed in U.S. Pat. 3,077,984 filed Feb. 12, 1960, for a Data Processing System by R. R. Johnson and in the textbook *Digital Computer Fundamentals* by T. C. Bartee, McGraw-Hill Publishing Company, Inc., 1960. Another form of priority selecting matrix other than that disclosed in FIG. 5 of this application has been disclosed, for example, in U.S. Pat. 3,473,155 filed May 4, 1964, for Apparatus Providing Access to Storage Device on Priority-Allocated Basis by J. F. Couleur et al.

It is evident that the variable priority system herein described, wherein the priority of interrupt requests are dynamically changed under control of the central processor, at the beginning or during the execution of a working program, is only a preferred embodiment of the claimed invention, and that modifications may be introduced therein without departing from the scope and spirit of the invention.

Particularly the system may be used in combination with other fixed priority systems or with cyclically scanning priority systems, known in the art, according to the circumstances.

What is claimed is:

1. In a data processing system comprising an information store, a central processor, a plurality of data handling devices, and a plurality of channels provided to enable said data handling devices to communicate with said central processor to provide an information exchange with said store, wherein said data handling devices generate respective request signals when they require communication with said central processor over said channels; priority determining apparatus for variably assigning relative priority levels to said request signals comprising:

a temporary storage member for each of said channels, each of said storage members being adapted to receive from said central processor and hold a representation of any one of a plurality of different priority levels assigned to the corresponding channel, and a variable priority network for each of said channels, each of said networks being adapted to receive a request signal for communication on the corresponding channel and response to the representation held in the corresponding storage member for generating a signal representing both said request signal and the priority level assigned by said representation.

2. The priority determining apparatus of claim 1, further comprising a priority selecting member, said priority selecting member being adapted to receive the signals generated by all of said priority networks and to deliver an output signal to said central processor representing the one of the channels whose interrupt request must be answered first by said central processor.

3. The apparatus of claim 1, wherein each of said temporary storage members delivers a plurality of output signals, said output signals representing the priority level representation held by said storage member, and wherein each of said variable priority networks comprises gating means response to said output signals delivered by the respective one of said storage members to selectively generate a pattern of output signals when a request signal is received by said network, said pattern of output signals representing the presence of said request signal and the priority level representation held by the respective storage member.

4. The apparatus of claim 1 wherein all of said temporary storage members are adapted to store concurrently representations of different priority levels.

* * * * *